United States Patent
Yeh

(10) Patent No.: US 12,132,404 B2
(45) Date of Patent: Oct. 29, 2024

(54) ISOLATED POWER SUPPLIES, PRIMARY-SIDE CONTROLLERS, AND SECONDARY- SIDE CONTROLLERS USING TRANSFORMER AS MEDIA FOR SIGNAL TRANSMISSION

(71) Applicant: Wen-Chung Yeh, Taipei (TW)

(72) Inventor: Wen-Chung Yeh, Taipei (TW)

( * ) Notice: Subject to any disclaimer, the term of this patent is extended or adjusted under 35 U.S.C. 154(b) by 261 days.

(21) Appl. No.: 17/844,318

(22) Filed: Jun. 20, 2022

(65) Prior Publication Data

US 2023/0045561 A1 Feb. 9, 2023

(30) Foreign Application Priority Data

Aug. 6, 2021 (TW) .................................. 110129065

(51) Int. Cl.
*H02M 3/335* (2006.01)
(52) U.S. Cl.
CPC ................................ *H02M 3/33523* (2013.01)
(58) Field of Classification Search
CPC ............. H02M 3/335; H02M 3/33523; H02M 3/33576; H02M 3/33592
See application file for complete search history.

(56) References Cited

U.S. PATENT DOCUMENTS

| 5,412,556 A * | 5/1995 | Marinus ................. H02M 1/40 363/21.08 |
| 2014/0112028 A1* | 4/2014 | Fahlenkamp ..... H02M 3/33576 324/726 |

* cited by examiner

*Primary Examiner* — Gary L Laxton
(74) *Attorney, Agent, or Firm* — McClure, Qualey & Rodack, LLP

(57) ABSTRACT

An isolated power supplies converts an input power source in a primary side into an output power source in a secondary side, capable of transmitting a signal from the secondary side to the primary side via a transformer. The transformer has a primary winding connected with a main switch, and a secondary winding connected with a secondary-side switch. A primary-side controller controls the main switch. A secondary-side controller controls the secondary-side switch and detects a demagnetization time of the transformer. Before the end of the demagnetization time, the secondary-side controller turns OFF the secondary-side switch to signal, via the transformer, the primary-side controller, which in response turns ON the main switch to operate the isolated power supply in a continuous-conduction mode or in a boundary mode.

14 Claims, 14 Drawing Sheets

ISOLATED POWER SUPPLIES, PRIMARY-SIDE CONTROLLERS, AND SECONDARY- SIDE CONTROLLERS USING TRANSFORMER AS MEDIA FOR SIGNAL TRANSMISSION

CROSS-REFERENCE TO RELATED APPLICATION

This application claims priority to and the benefit of Taiwan Application Series Number 110129065 filed on Aug. 6, 2021, which is incorporated by reference in its entirety.

BACKGROUND

The present disclosure relates generally to isolated power supplies, and more particularly to isolated power supplies that use a transformer as a media for a secondary-side controller to signal a primary-side controller.

An isolated power supply converts input power source in a primary side into an output power source in a secondary side while the primary and secondary sides are galvanically isolated from each other, preventing the electronic equipment connected to the secondary side from being damaged because of lightning strikes for example received in the primary side.

Conventional flyback power supplies are a kind of isolated power supplies, having in the primary side a main switch and a primary winding of a transformer connected in series. The main switch is turned ON or OFF to make the transformer energized or de-energized. In the secondary side, the current from a secondary winding of the transformer is rectified when the transformer is de-energized, to build up an output power source. Generally, the main switch is controlled by a PWM (pulse-width-modulation) signal generated by a primary-side controller, which detects the status of the output power source via the help of a photo coupler or an auxiliary winding of the transformer, to provide compensation and to determine the duty cycle, the cycle time, etc., of the PWM signal. The compensation in the primary side accumulates difference between the current status of the output power source and an expected status of the output power source, and will cause a certain time delay for the primary-side controller to respond to any change to the load that the output power source supplies power to. In other words, conventional flyback power supplies with compensation structures are slow in view of transient load response.

To improve transient load response, some isolated power supplies use additional transformers and/or capacitors as medias, via which a second-side controller signals a primary-side controller. In response to the signals via the additional transformers and/or capacitors, the primary-side controller is capable of quickly turning ON a main switch, starting a new switching cycle, so transient load response is improved. Additional transformers and/or capacitors mean a higher cost and a larger product size however.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
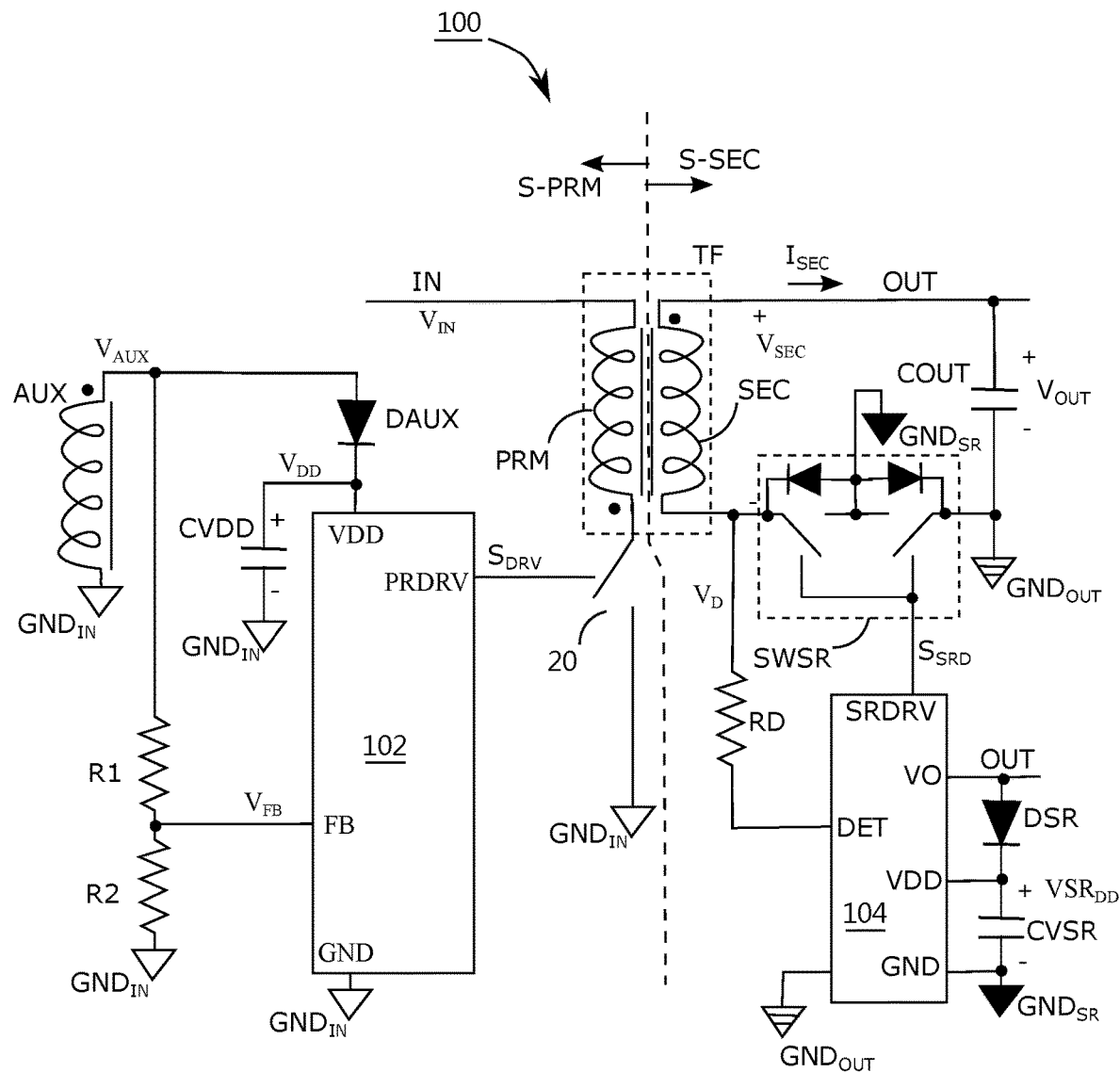
FIG. 1 demonstrates an isolated power supply according to embodiments of the invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure, or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures, or characteristics may be combined in any suitable combinations and/or subcombinations in one or more embodiments or examples. Particular features, structures, or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

An embodiment of the invention, a secondary-side controller uses the transformer that energizes and de-energizes in each switching cycle as a media to signal a primary-side controller, which in response turns ON a main switch to start a new switching cycle. The turning ON of the main switch is triggered by the secondary-side controller, without the help of additional inductive devices or capacitors.

An embodiment of the invention provides an isolated power supply with a transformer, a main switch, a secondary-side switch, a primary-side controller, and a secondary-side controller. The primary-side controller turns ON and OFF the main switch to energize and de-energize the transformer. The secondary-side controller detects an output power source to determine a blanking time. The secondary-side controller detects the transformer to decide whether the transformer is during a demagnetization time, in which the transformer de-energizes. When both the blanking time and the demagnetization time do not end, the secondary-side controller can turn ON the secondary-side switch, performing rectification and making the transformer supply power to the output power source. After the blanking time ends and before the demagnetization time ends, the secondary-side controller turns OFF the secondary-side switch, so the transformer stops supplying power to the output power source. In response to the secondary-side switch being switched OFF before the end of the demagnetization time, the primary-side controller turns ON the main switch, so the isolated power supply operates in a continuous conduction mode (CCM) or a boundary mode (BM). If the blanking time continues after the end of the demagnetization time, the secondary-side controller turns OFF the secondary-side switch after the end of the demagnetization time. When the blanking ends after the end of the demagnetization time, the secondary-side controller briefly turns ON the secondary-side switch to signal the primary-side controller, which in response turns ON the main switch, so that the isolated power supply operates in a discontinuous conduction mode (DCM). When operating in a DCM or a BM, the isolated power supply can perform ZVS on the main switch, turning ON the main switch when a voltage across the channel of the main switch is at its minimum.

From another point of view, before the end of the demagnetization time, the secondary-side controller can optionally stop the transformer supplying power to the output power source, so as to signal the primary-side controller, which in response starts a new switching cycle, operating the isolated power supply in a CCM or a BM. After the end of the demagnetization time, the secondary-side controller can make the output power source energize the transformer supplying power briefly, so as to signal the primary-side controller, which in response starts a new switching cycle, operating the isolated power supply in a DCM.

FIG. 1 demonstrates isolated power supply 100 according to embodiments of the invention. Isolated power supply 100 has primary side S-PRM and secondary side S-SEC galvanically isolated from each other. Isolated power supply 100 converts input power source $V_{IN}$ in primary side S-PRM into output power source $V_{OUT}$ in secondary side S-SEC. Input power source $V_{IN}$ in reference to input ground line $GND_{IN}$ is generated by for example a full-wave rectifier that rectifies an alternating-current mains voltage from a wall outlet.

In primary side S-PRM, isolated power supply 100 has, but is not limited to have, primary winding PRM and auxiliary winding AUX of transformer IF, main switch 20, primary-side controller 102, rectifier diode DAUX, capacitor CVDD, and resistors R1 and R2, connection of which is shown in FIG. 1. Resistors R1 and R2 construct a voltage divider, which divides winding voltage $V_{AUX}$ to provide to primary-side controller 102 feedback voltage $V_{FB}$, a representative of winding voltage $V_{AUX}$, which equally represents the voltage drops across primary winding PRM and secondary winding SEC because of inductive coupling. Primary-side controller 102 detects feedback voltage $V_{FB}$ to detect winding voltage $V_{AUX}$. Any reference voltage that primary-side controller 102 compares with feedback voltage $V_{FB}$ corresponds to anther reference voltage which winding voltage $V_{AUX}$ is compared with.

It is supposed in FIG. 1 that the turns ratio of transformer TF is NP:NA:NS=1:M:N, where NP, NA and NS are numbers of turns of primary winding PRM, auxiliary winding AUX and secondary winding SEC respectively, and both M and N are positive real numbers.

In secondary side S-SEC, isolated power supply 100 has, but is not limited to have, secondary winding SEC of transformer IF, output capacitor COUT, secondary-side switch SWSR, secondary-side controller 104, rectifier diode DSR, capacitor CVSR, and detector resistor RD, connection of which is shown in FIG. 1. In this embodiment, secondary-side switch SWSR is a bidirectional switch, which has bidirectional current flow capabilities when it is turned ON, and provides bidirectional voltage blocking when it is turned OFF. FIG. 1 demonstrates secondary-side switch SWSR as the combination of two switches with body diodes back-to-back connected, and the joint between the two switches is denoted as ground line $GND_{SR}$. There are two different ground lines $GND_{SR}$ and $GND_{OUT}$ in secondary side S-SEC, used as 0-voltage references for operation power source $VSR_{DD}$ and output power source $V_{OUT}$ respectively. Both the two switches in secondary-side switch SWSR are jointly controlled by driving signal $S_{SRD}$. In other embodiments, the two switches in secondary-side switch SWSR are controlled by different signals respectively. Some embodiments of the invention might use a single switch to embody secondary-side switch SWSR.

When primary-side controller 102 outputs pulse signal $S_{DRV}$ to turn ON main switch 20, input power source $V_{IN}$ energizes transformer TF. When main switch 20 is turned OFF by pulse signal $S_{DRV}$, transformer TF starts de-energizing, releasing the energy it stores, to supply power to output power source $V_{OUT}$, operation power source $V_{DD}$, or operation power source $VSR_{DD}$.

In the embodiment of FIG. 1, secondary-side controller 104, by controlling the voltage drop across secondary winding SEC, signals primary-side controller 102 in primary side S-PRM, which in response turns ON main switch 20 to start a new switching cycle TCYC. In one embodiment, when output power source $V_{OUT}$ and operation power source $VSR_{DD}$ both are higher than target voltages they are required to be respectively, secondary-side controller 104 will not signal primary-side controller 102, so main switch 20 is constantly turned OFF. Once secondary-side controller 104 finds output power source $V_{OUT}$ is insufficient for example, it controls secondary-side switch SWSR to signal primary-side controller 102 in primary side S-PRM, so primary-side controller 102 accordingly and briefly turns ON main switch 20 to start a new switching cycle.

Figure 2A:
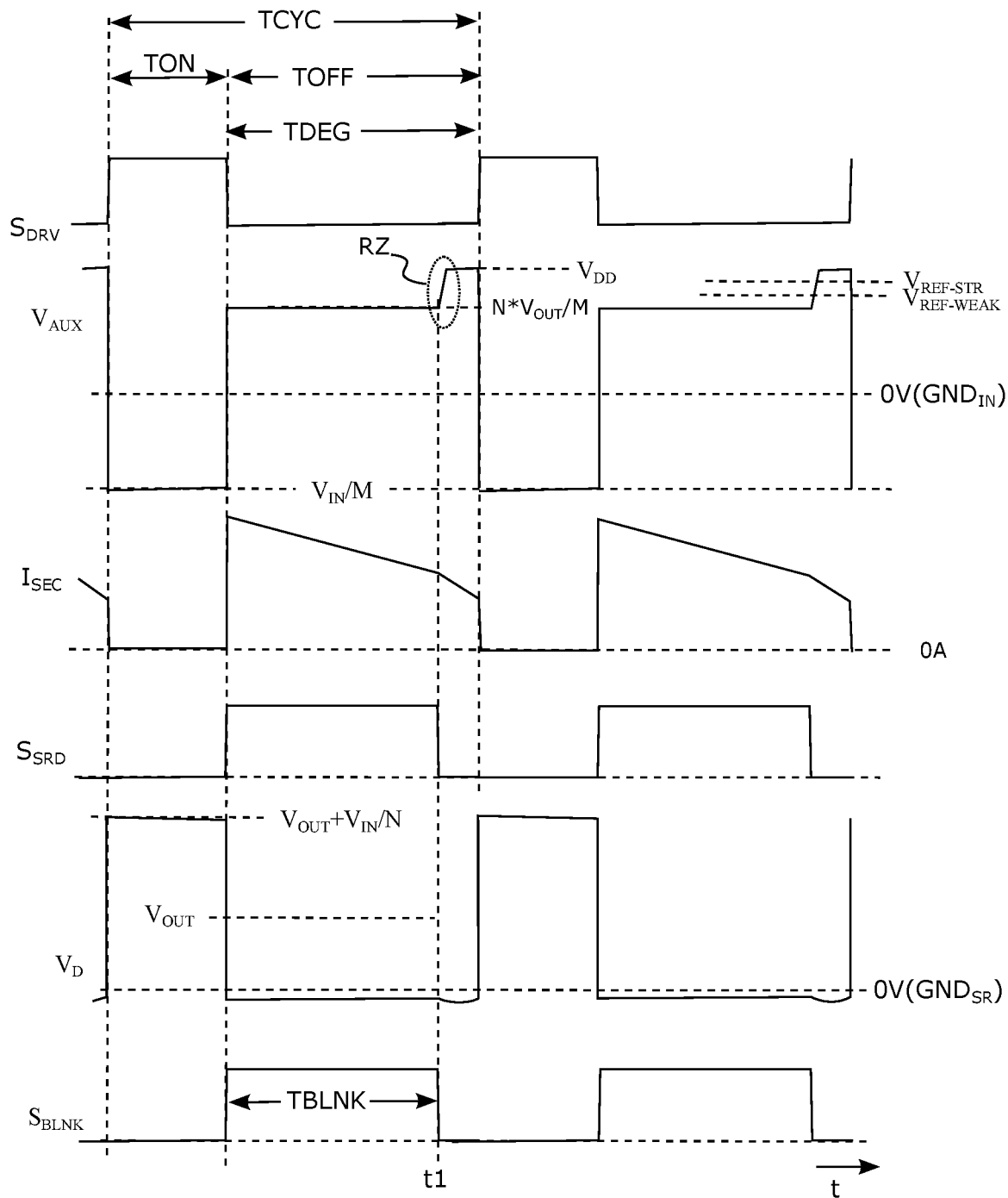
FIGS. 2A, 2B and 2C show waveforms of signals in the isolated power supply of FIG. 1, operating in CCM, BM, and DCM, respectively.
Figure 2B:
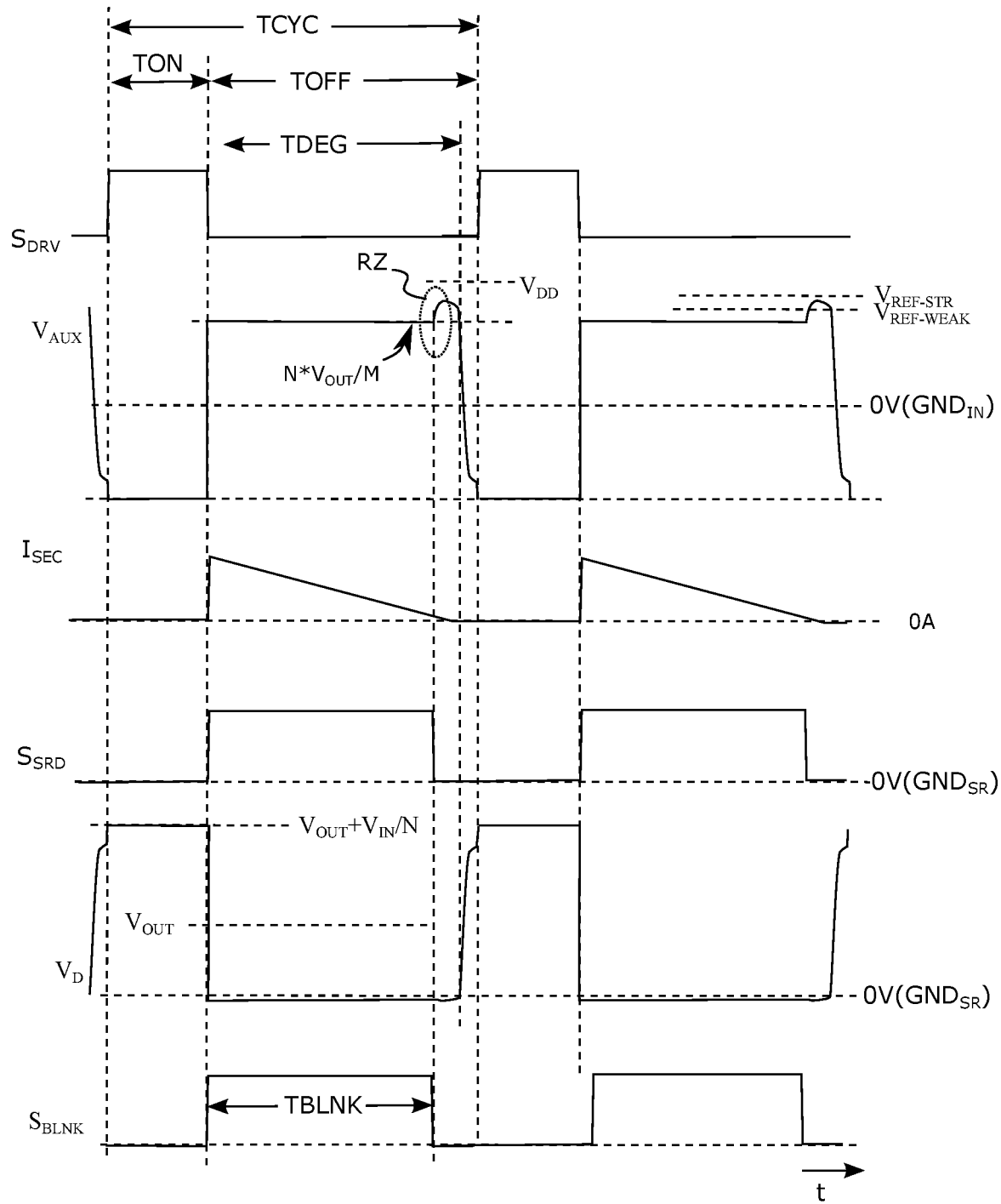
Figure 2C:
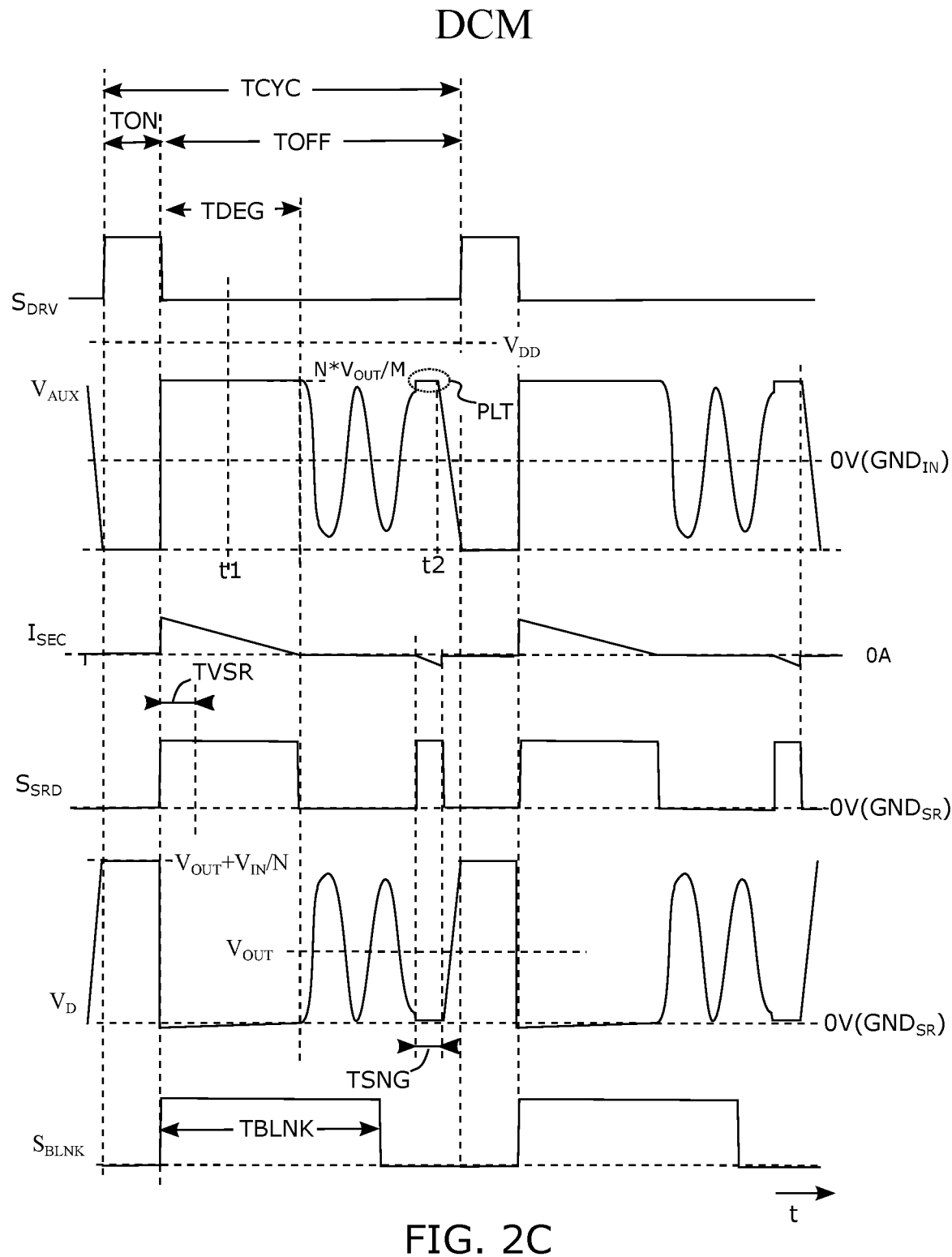

FIGS. 2A, 2B and 2C show waveforms of signals in isolated power supply 100 of FIG. 1, operating in continuous-conduction mode (CCM), boundary mode (BM), and discontinuous-conduction mode (DCM), respectively. BM is also known as critical mode (CRM) in the art. Each of FIGS. 2A, 2B and 2C shows, from top to bottom, pulse signal $S_{DRV}$, winding voltage $V_{AUX}$ of auxiliary winding AUX, winding current $I_{SEC}$ from secondary winding SEC, driving signal $S_{SRD}$, channel signal $V_D$ at the joint between secondary-side switch SWSR and secondary winding SEC, and blanking signal $S_{BLNK}$ that is internally generated and used inside secondary-side controller 104. The logic value of a driving signal indicates the status of the switch the driving signal controls. For example, main switch 20 is turned ON, providing a short circuit, when pulse signal $S_{DRV}$ is high or in logic 1.

As shown in FIGS. 2A, 2B and 2C, a switching cycle TCYC consists of an ON time TON and an OFF time TOFF. In this specification, an ON time TON means the period of time when main switch 20 is turned ON, and an OFF time TOFF another period of time when main switch 20 is turned OFF.

Both OFF time TOFF and demagnetization time TDEG start when pulse signal $S_{DRV}$ turns OFF main switch 20, and transformer TF starts de-energizing. When demagnetization time TDEG continues, winding current $I_{SEC}$ shown in FIG. 1 is positive, channel signal $V_D$ is negative in comparison with the voltage at ground lines $GND_{SR}$, and winding voltage $V_{AUX}$ in primary side S-PRM is about $V_{OUT}*N/M$. Therefore, secondary-side controller 104 can detect whether demagnetization time TDEG ends by sensing whether channel signal $V_D$ about becomes positive, and primary-side controller 102 can detect the same by sensing whether winding voltage $V_{AUX}$ falls below a reference voltage about $V_{OUT}*N/M$. Please keep in mind that the demagnetization time TDEG determined by secondary-side controller 104 may be different from that determined by primary-side controller 102. The difference between them is minor however and will not influence the practice of the invention. In view of simplification the following teaching will deem the two slightly-different demagnetization times as the same demagnetization time, denoted as TDEG in FIGS. 2A, 2B and 2C. In FIG. 2A, which operates in CCM, demagnetization time TDEG is substantial equal to OFF time TOFF. In FIGS. 2B and 2C, operating in BM and DCM respectively, demagnetization time TDEG is only a beginning portion of OFF time TOFF.

At the beginning of demagnetization time TDEG or after a predetermined period after the beginning of demagnetization time TDEG, secondary-side controller 104 controls secondary-side switch SWSR to perform synchronous rectification, and turns ON secondary-side switch SWSR to let transformer TF supply power to output power source $V_{OUT}$, winding current $I_{SEC}$ charging output capacitor COUT, as shown in FIGS. 2A, 2B and 2C.

Secondary-side controller 104 provides blanking signal $S_{BLNK}$ based on output power source $V_{OUT}$, and blanking signal $S_{BLNK}$ indicates blanking time TBLNK as shown in FIGS. 2A, 2B and 2C. For example, blanking time TBLNK continues if output power source $V_{OUT}$ exceeds target voltage $V_{REF-OUT}$, and it ends if output power source $V_{OUT}$ is below target voltage $V_{REF-OUT}$. Some embodiments may use a PWM signal generator to determine the length of blanking time TBLNK based on a compensation generated by comparing output power source $V_{OUT}$ with target voltage $V_{REF-OUT}$. According to some embodiments of the invention, the end of blanking time TBLNK implies the moment that secondary-side controller 104 should signal primary-side controller 102 to start a new switching cycle TCYC, converting more energy to maintain or pull up output power source $V_{OUT}$.

In FIG. 2A, secondary-side controller 104 turns OFF secondary-side switch SWSR to stop transformer TF supplying power to output power source $V_{OUT}$, and primary-side controller 102, sensing the waveform of winding voltage $V_{AUX}$, is therefore informed, starting a new switching cycle TCYC. The waveforms shown in FIG. 2A indicate that blanking time TBLNK ends earlier than demagnetization time TDEG does, secondary-side controller 104 turns OFF secondary-side switch SWSR as soon as blanking time TBLNK ends, and transformer TF suddenly stops supplying power to output power source $V_{OUT}$. Meanwhile, since demagnetization time TDEG has not ended and winding current $I_{SEC}$ is still positive, transformer TF still stores some leftover energy, capable of supplying power to operation power source $VSR_{DD}$ and operation power source $V_{DD}$. Therefore, after secondary-side switch SWSR is turned OFF, winding voltage $V_{AUX}$ climbs up from reflective voltage $N*V_{OUT}/M$ to operation power source $V_{DD}$ as shown in FIG. 2A. Turning OFF secondary-side switch SWSR causes rising edge RZ of winding voltage $V_{AUX}$ during demagnetization time TDEG. Also shown between reflective voltage $N*V_{OUT}/M$ and operation power source $V_{DD}$ in FIG. 2A are two reference voltages $V_{REF-STR}$ and $V_{REF-WEAK}$ where reference voltage $V_{REF-STR}$ is higher than reference $V_{REF-WEAK}$. Primary-side controller 102 detects whether winding voltage $V_{AUX}$ has rising edge RZ during demagnetization time TDEG, to determine whether secondary-side controller 104 is signaling it to start a new switching cycle. In FIG. 2A, through the help of feedback voltage $V_{FB}$, primary-side controller 102 detects that winding voltage $V_{AUX}$ has rising edge RZ rising up to more than reference voltage $V_{REF-STR}$, and, right away or delay time Tdelay after the detection, primary-side controller 102 turns ON main switch 20, so isolated power supply 100 with waveforms shown in FIG. 2A operates in CCM. For instance, delay time Tdelay is determined to be about 0 ns if operation power source $V_{DD}$ is very high, more than 20V for example, and about 100 ns if operation power source $V_{DD}$ is very low, less than 12V for example. Transformer TF supplies power to operation power source $VSR_{DD}$ or operation power source $V_{DD}$ during delay time Tdelay. Demagnetization time TDEG ends when primary-side controller 102 turns ON main switch 20.

FIG. 2B, similar with FIG. 2A, shows that blanking time TBLNK ends earlier than demagnetization time TDEG. Nevertheless, winding current $I_{SEC}$ in FIG. 2B is quite weak, or almost 0A, when blanking time TBLNK ends. As a result, winding voltage $V_{AUX}$ in FIG. 2B can not climb up to as high as operation power source $V_{DD}$ or reference voltage $V_{REF-STR}$. In FIG. 2B, primary-side controller 102, via the help of feedback voltage $V_{FB}$, finds that winding voltage $V_{AUX}$ has rising edge RZ that merely climbs up to the lower reference voltage $V_{REF-WEAK}$. Accordingly primary-side controller 102 does not turn ON main switch 20 immediately when it finds rising edge RZ of feedback voltage $V_{FB}$ in FIG. 2B, but keeps main switch 20 turned OFF until at about the moment when the first valley of winding voltage $V_{AUX}$ appears after the end of demagnetization time TDEG, as shown in FIG. 2B. As a new switching cycle TCYC starts almost at the end of demagnetization time TDEG in FIG. 2B, isolated power supply 100 operates in BM or CRM.

In FIG. 2C, secondary-side controller 104 briefly turns ON secondary-side switch SWSR to let output power source $V_{OUT}$ energize transformer IF, and as being informed by the turning-ON of secondary-side switch SWSR, primary-side controller 102 in response starts a new switching cycle TCYC. In FIG. 2C, secondary-side switch SWSR acts as a synchronous rectifier before the end of blanking time TBLNK, which ends later than demagnetization time TDEG does. Therefore, secondary-side switch SWSR is turned ON during demagnetization time TDEG, and is kept OFF after the end of demagnetization time TDEG and before the end of blanking time TBLNK. Please note that winding voltage $V_{AUX}$ oscillates after the end of demagnetization time TDEG, and generates local minimums, or valleys. After the end of blanking time TBLNK, secondary-side controller 104, every time when a valley appears or is about to appear, briefly turns ON secondary-side switch SWSR for predetermined time period TSNG to inform primary-side controller 102 that blanking time TBLNK has come to an end. During time period TSNG, winding current $I_{SEC}$ is lightly negative, the voltage across secondary winding SEC is substantially equal to output power source $V_{OUT}$, and output power source $V_{OUT}$ energizes transformer TF. Primary-side controller 102 can detect for example whether the waveform of winding voltage $V_{AUX}$ has plateau PLT with a height of about $N*V_{OUT}/M$ and a width of about time period TSNG, as shown in FIG. 2C, to determine whether secondary-side switch SWSR is turned ON for time period TSNG. Shown in FIG. 2C, primary-side controller 102 finds plateau PLT at about moment t2, and, after then, primary-side controller 102 turns ON main switch 20 at the moment when a next valley of winding voltage $V_{AUX}$ appears or is about to appear, starting a new switching cycle. Accordingly, isolated power supply 100 with waveforms shown in FIG. 2C operates in DCM.

Primary-side controller 102 in primary side S-PRM acknowledges the end of blanking time TBLNK as secondary-side controller 104 in secondary side S-SEC signals to it via transformer IF, and accordingly turns ON main switch 20 to end a cycle time TCYC and start a new one. According to embodiments of the invention, the length of a next ON time TON can be determined or adjusted based on both the length of the cycle time TCYC that just ended and the peak of the current flowing through main switch 20. The peak of the current flowing through main switch 20 can be used to determine expected cycle time TCYCEXP, and the comparison between expected cycle time TCYCEXP and the cycle time TCYC that just happened could be used to adjust the length of ON time TON in the future, so as to make expected cycle time TCYCEXP approach cycle time TCYC. Generally speaking, the longer an ON time TON, the higher the peak, the heavier the load that output power source $V_{OUT}$ supplies power to, the higher an expected switching frequency of main switch 20, the shorter expected cycle time TCYCEXP. Nevertheless, the higher the peak, the more the energy transferred to secondary side S-SEC, the longer blanking time TBLNK that shall happen, the longer cycle time TCYC. Therefore, there must be a suitable length of an ON time TON that can make expected cycle time TCYCEXP substantially equal to cycle time TCYC. For example, based on a past switching cycle, cycle time TCYC was 10 u sec and expected cycle time TCYCEXP was nevertheless 12 u sec based on the ON time TON in the past switching cycle. For a following switching cycle, the ON time TON is determined to prolong by 1 u sec, the half of the difference between cycle time TCYC and expected cycle time TCYCEXP, such that the cycle time TCYC of the flowing switching cycle would become longer and expected cycle time TCYCEXP shorter.

Figure 3:
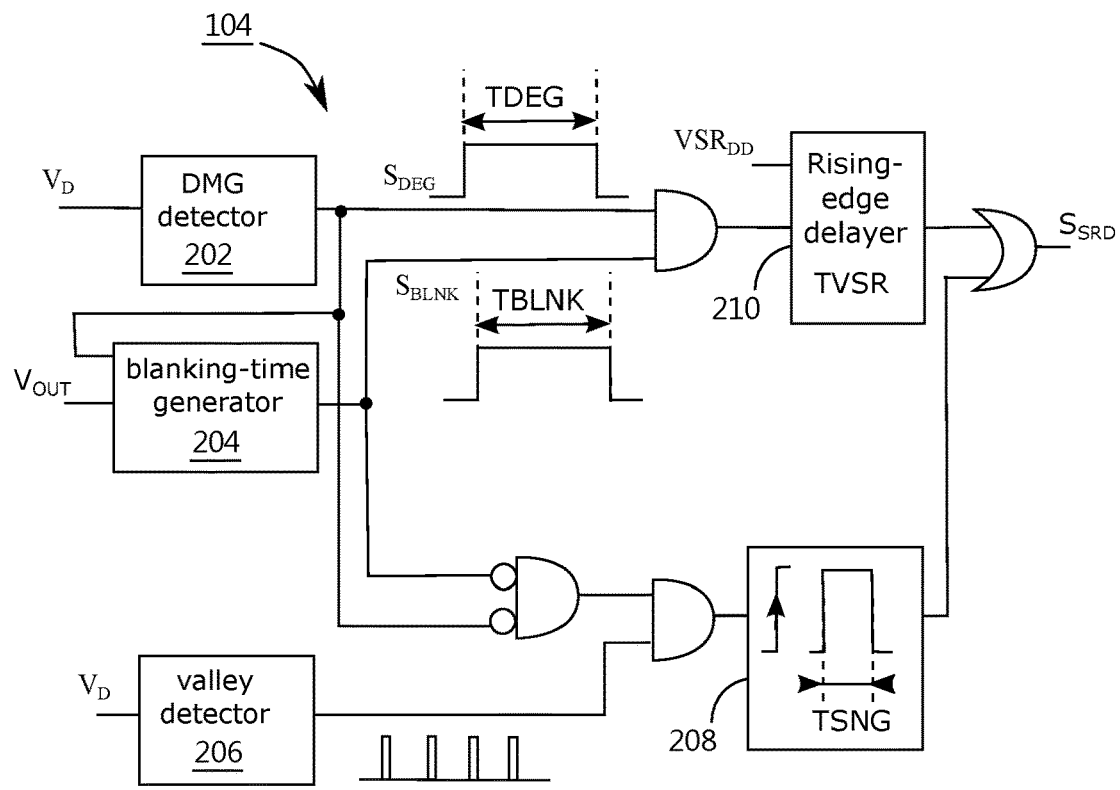
FIG. 3 demonstrates a secondary-side controller according to embodiments of the invention.

FIG. 3 demonstrates secondary-side controller 104, including demagnetization detector 202, blanking-time generator 204, valley detector 206, rising-edge delayer 210, pulse generator 208, and some logics.

Based on channel signal $V_D$, demagnetization detector 202 determines whether transformer TF demagnetizes or is releasing the energy it stores, and accordingly provides demagnetization signal $S_{DEG}$, whose pulse width represents demagnetization time TDEG. Blanking time generator 204 generates blanking signal $S_{BLNK}$ to define blanking time TBLNK in response to output power source $V_{OUT}$. When blanking time TBLNK comes to an end, it implies that output power source $V_{OUT}$ might be over low and that conversion of energy from primary side S-PRM to second side S-SEC should start to support output power source $V_{OUT}$. Valley detector 206 detects channel signal $V_D$, and provides a short pulse every time when a valley of channel signal $V_D$ is about to occur, or when channel signal $V_D$ is about at a valley or a local minimum. Pulse generator 208 provides a pulse with pulse width of TSNG in response to each short pulse from valley detector 206. Rising-edge delayer 210 may postpone for a period of TVSR to transmit a rising edge.

Please refer to FIGS. 2A, 2B and 3, and it is supposed that rising-edge delayer 210 delays nothing in FIGS. 2A and 2B. As shown in FIG. 3, when demagnetization time TDEG does not end as demagnetization signal $S_{DEG}$ is still logic 1, driving signal $S_{SRD}$ equals to blanking signal $S_{BLNK}$ in logic. Therefore, once blanking time TBLNK ends before the end of demagnetization time TDEG, blanking signal $S_{BLNK}$ from blanking time generator 204 turns OFF secondary-side switch SWSR, so as to signal primary-side controller 102 via transformer TF. It implies that isolated power supply 100 in the meantime operates in CCM or BM as shown in FIGS. 2A and 2B.

Please refer FIGS. 2C and 3. As shown in FIG. 3, when demagnetization time TDEG ends earlier than blanking time TBLNK, driving signal $S_{SRD}$ first turns OFF secondary-side switch SWSR after demagnetization time TDEG ends. After the end of blanking time TBLNK, each pulse that valley detector 206 outputs triggers a pulse from pulse generator 208, which briefly turns ON secondary-side switch SWSR for a period of TSNG at the time when a valley of channel signal $V_D$ is about to occur. Since secondary-side switch SWSR is turned ON when channel signal $V_D$ is at about a valley, valley switching is performed to secondary-side switch SWSR, and the switching loss of secondary-side switch SWSR is reduced or minimized. By turning ON secondary-side switch SWSR for a period of TSNG, pulse generator 208 effectively informs primary-side controller 102 in primary side S-PRM the end of blanking time TBLNK, so primary-side controller 102 can start a new switching cycle, operating in DCM, as shown in FIG. 2C.

Rising-edge delayer 210, or a timer, is inserted in the position shown in FIG. 3, for delaying to transmit a rising edge for period TVSR, which may be determined by operation power source $VSR_{DD}$. Rising-edge delayer 210 does not delay to relay any falling edge that rising-edge delayer 210 receives. For example, period TVSR is 100 ns when operation power source $VSR_{DD}$ is below 10V, and 0 ns when operation power source $VSR_{DD}$ exceeds 20V. During period TVSR shown in FIG. 2C, which locates in the beginning of demagnetization time TDEG, secondary-side switch SWSR could be briefly turned OFF, letting transformer TF release its stored power to charge operation power source $VSR_{DD}$, which might be over low when isolated power supply 100 operates in DCM.

Figure 4:
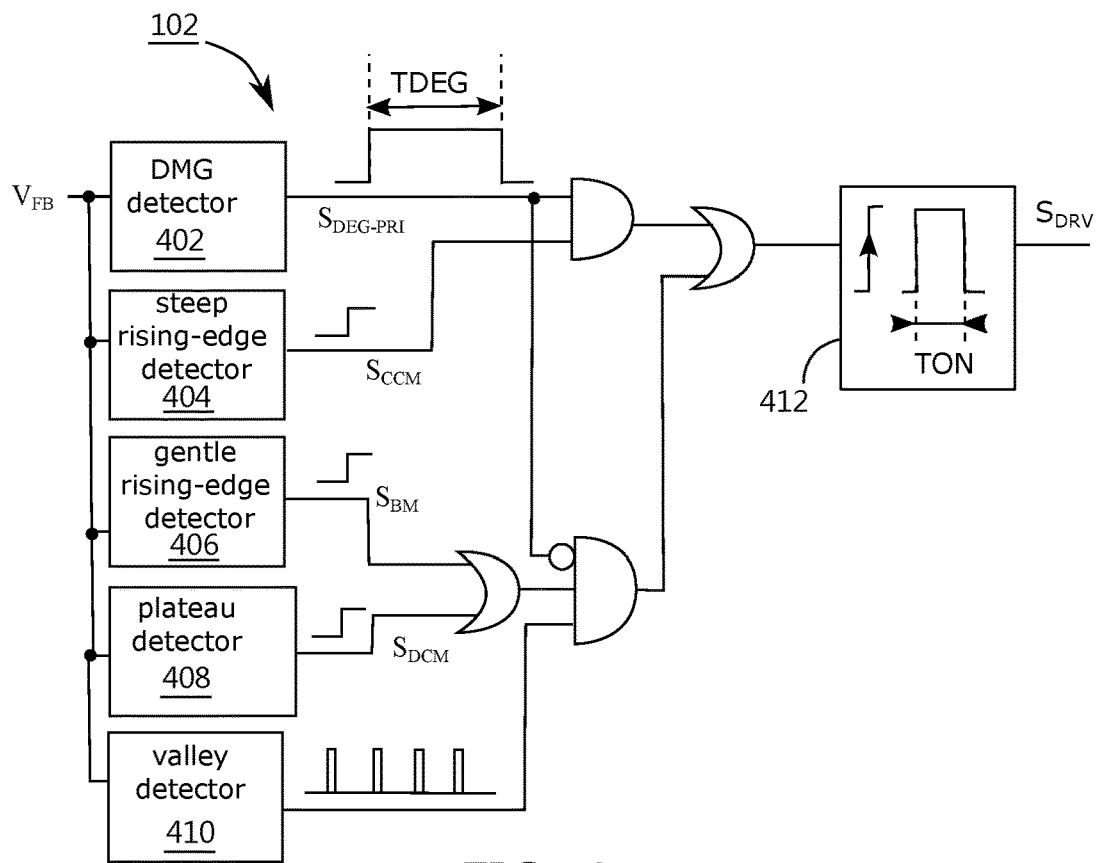
FIG. 4 demonstrates a primary-side controller according to embodiments of the invention.

FIG. 4 demonstrates primary-side controller 102, including demagnetization detector 402, steep rising-edge detector 404, gentle rising-edge detector 406, plateau detector 408, valley detector 410, pulse generator 412, and some logics.

Demagnetization detector 402 detects feedback voltage $V_{FB}$, which represents winding voltage $V_{AUX}$, to determine whether transformer TF is undergoing demagnetization, and to accordingly provide demagnetization signal $S_{DEG-PRI}$, whose pulse width represents demagnetization time TDEG. For example, when winding voltage $V_{AUX}$ is about reflective voltage $N*V_{OUT}/M$, transformer TF is deemed to demagnetize, and demagnetization signal $S_{DEG-PRI}$ is kept 1 in logic, meaning the continuation of demagnetization time TDEG. Otherwise, when winding voltage $V_{AUX}$ falls considerably below reflective voltage $N*V_{OUT}/M$, it is deemed that demagnetization stops, and demagnetization signal $S_{DEG-PRI}$ turns to be 0 in logic, ending demagnetization time TDEG. Both steep rising-edge detector 404 and gentle rising-edge detector 406 detect whether a rising edge, a predetermined waveform, occurs to winding voltage $V_{AUX}$ during demagnetization time TDEG. If the rising edge is so steep that winding voltage $V_{AUX}$ rises to exceed reference voltages $V_{REF-STR}$, steep rising-edge detector 404 generates step signal $S_{CCM}$. If the rising edge is so gentle that winding voltage $V_{AUX}$ rises to merely exceed reference voltages $V_{REF-weak}$, gentle rising-edge detector 406 generates step signal $S_{BM}$, and steep rising-edge detector 404 constantly keeps its output 0 in logic. Plateau detector 408 provides step signal $S_{DCM}$ if plateau PLT with a height of reflective voltage $N*V_{OUT}/M$ and a duration of about TSNG occurs to winding voltage $V_{AUX}$. Valley detector 410 provides a short pulse each time when winding voltage $V_{AUX}$ is about at its valley, or local minimum. Pulse generator 412 provides pulse signal $S_{DRV}$ with a pulse width of ON time TON when it input receives a rising edge, to briefly turn ON main switch 20 for a duration of ON time TON. As explained before, ON time TON may be adjusted by pulse generator 412 in response to a previous switching cycle TCYC.

Each of steep rising-edge detector 404 and gentle rising-edge detector 406 is an end-of-cycle detector, which detects whether winding voltage $V_{AUX}$ is more than reflective voltage $N*V_{OUT}/M$ by a predetermined voltage during demagnetization time TDEG, to determine whether secondary-side controller 104 is informing primary-side controller 102 the end of blanking time TBLNK, and, if so, to turn ON main switch 20 for a duration of ON time TON. It will be detailed later that steep rising-edge detector 404 detects whether winding voltage $V_{AUX}$ has a specific rising edge and that gentle rising-edge detector 406 detects whether winding voltage $V_{AUX}$ has another specific rising edge.

Please refer to FIGS. 2A and 4. Derivable from FIG. 4, while demagnetization signal $S_{DEG-PRI}$ is logic 1 and demagnetization time TDEG does not end, the rising edge of step signal $S_{CCM}$ can trigger pulse generator 412, which in response turns ON main switch 20 before the end of demagnetization time TDEG. Therefore, step signal $S_{CCM}$ output from steep rising-edge detector 404 causes isolated power supply 100 in FIG. 2A to operate in CCM.

Please refer to FIGS. 2B and 4. Derivable from FIG. 4, while demagnetization signal $S_{DEG-PRI}$ is logic 1, demagnetization time TDEG does not end, and step signal $S_{CCM}$ does not has a rising edge yet, the rising edge of step signal $S_{BM}$ can let the 1st pulse from valley detector 410 trigger pulse generator 412, which in response turns ON main switch 20 at about the moment when winding voltage $V_{AUX}$ is about at the first valley after demagnetization time TDEG, performing valley switching to main switch 20. Therefore, step signal $S_{BM}$ output from gentle rising-edge detector 406 causes isolated power supply 100 in FIG. 2B to operate in BM or CRM.

Please refer to FIGS. 2C and 4. Derivable from FIG. 4, if both step signals $S_{CCM}$ and $S_{BM}$ do not turn into logic 1 during demagnetization time TDEG, the finding of plateau PLT with a height of reflective voltage $N*V_{OUT}/M$ and a duration of TSNG could let the next coming pulse from valley detector 410 trigger pulse generator 412, which in response turns ON main switch 20 at about the moment when winding voltage $V_{AUX}$ is about at a valley. Therefore, isolated power supply 100 in FIG. 2C operates in DCM and performs valley switching to main switch 20.

Figure 5:
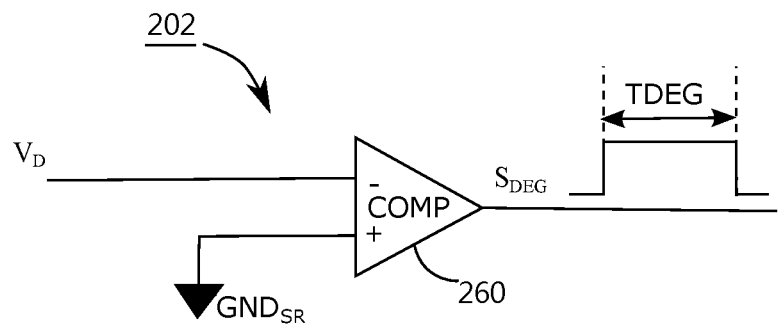
FIG. 5 demonstrates a demagnetization detector.

FIG. 5 demonstrates demagnetization detector 202 in FIG. 3, where comparator 260 compares channel signal $V_D$ with ground line $GND_{SR}$ to generate demagnetization signal $S_{DEG}$ and to determine demagnetization time TDEG, which in this embodiment is the period when channel signal $V_D$ is less than the voltage of ground line $GND_{SR}$. According to some embodiments of the invention, the non-inverted input of comparator 260 receives a very little negative voltage, −0.1V for example.

Figure 6A:
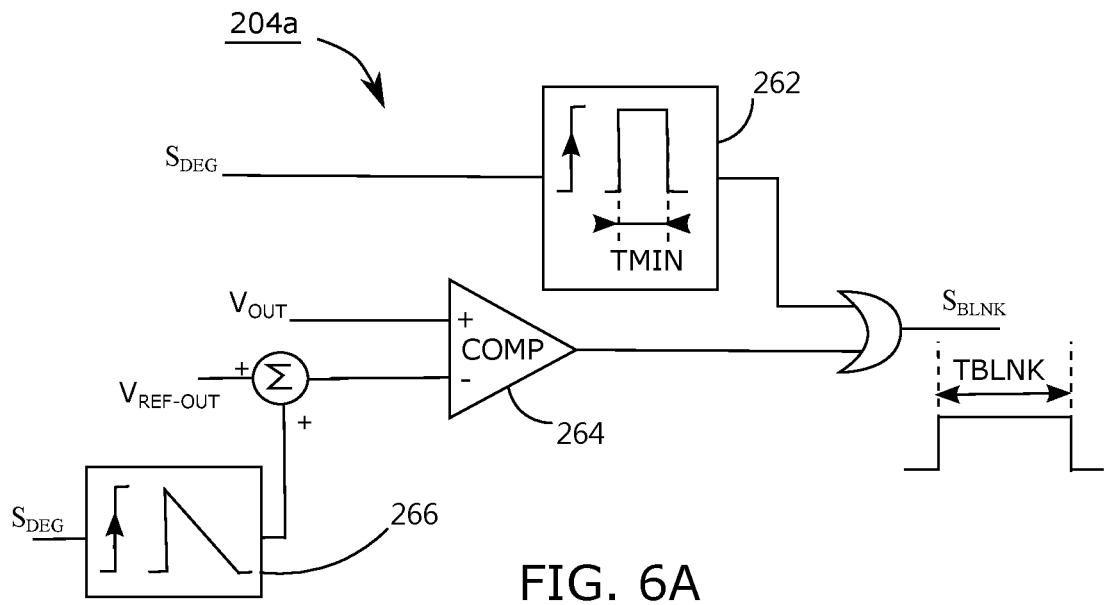
FIGS. 6A and 6B demonstrate two blanking time generators.

FIG. 6A demonstrates blanking time generator 204a suitable for use in FIG. 3. Pulse generator 262 makes blanking time TBLNK not less than minimum time TMIN. Comparator 264 compares output power source $V_{OUT}$ with target voltage $V_{REF-OUT}$. At the time when output power source $V_{OUT}$ drops below target voltage $V_{REF-OUT}$, blanking time TBLNK should end to inform primary-side controller 102 for further power supply. Triangular-wave generator 266 slightly adjusts target voltage $V_{REF-OUT}$, making it highest at the beginning and ramping down slowly. Triangular-wave generator 266 could beneficially provide load compensation, which regulates output power source $V_{OUT}$ at a slightly higher voltage when a switching cycle is shorter.

Figure 6B:
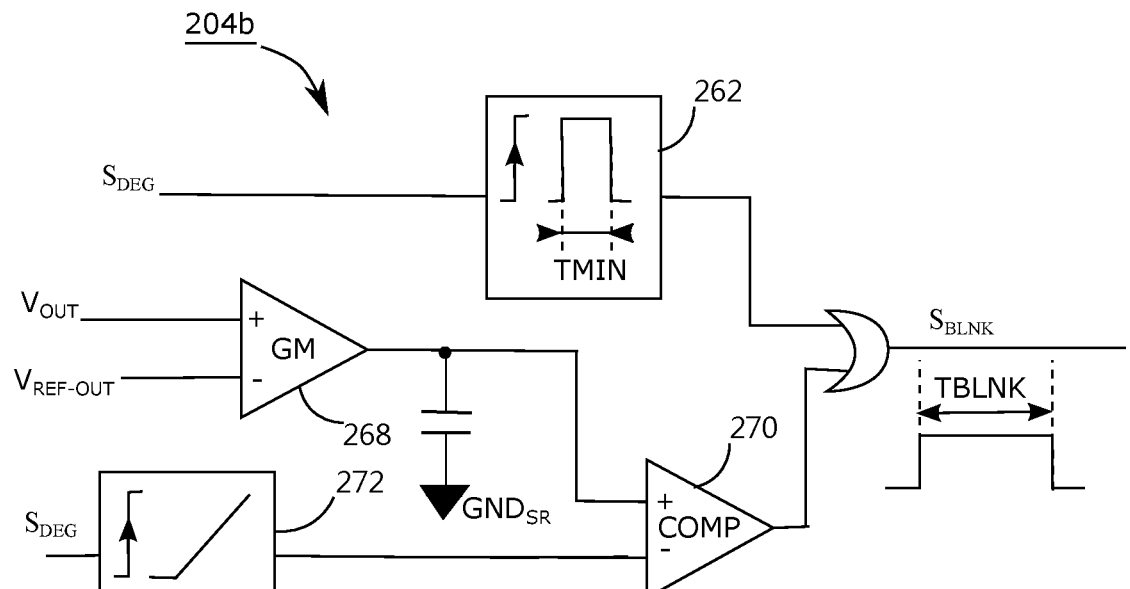

FIG. 6B demonstrates blanking time generator 204b suitable for use in FIG. 3. Generally, transconductor 268, comparator 270, triangular-wave generator 272 and relevant apparatuses construct a pulse-width-modulation (PWM) generator, which is used to regulate output power source $V_{OUT}$ at about target voltage $V_{REF-OUT}$. The lower output power source $V_{OUT}$ in average, the shorter blanking time TBLNK.

Figure 7:
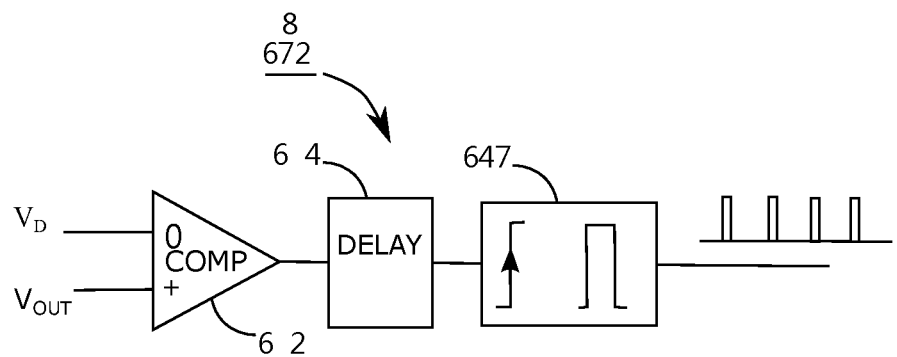
FIG. 7 demonstrates a valley detector.

FIG. 7 demonstrates valley detector 206 suitable for use in FIG. 3. It is shown in FIG. 2C that a valley of channel signal $V_D$ is about to occur when channel signal $V_D$ drops across output power source $V_{OUT}$. Comparator 276 in FIG. 7 checks whether channel signal $V_D$ drops below output power source $V_{OUT}$, and delayer 278 delays the output of comparator 276 for a predetermined period to let pulse generator 280 generate a short pulse, a rough indication trying to indicate the occurrence of a valley bottom.

Figure 8:
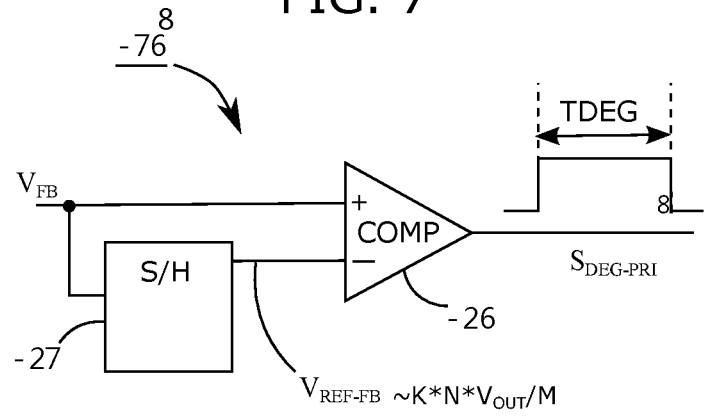
FIG. 8 demonstrates a demagnetization detector.

FIG. 8 demonstrates demagnetization detector 402 suitable for use in FIG. 4. Comparing feedback voltage $V_{FB}$ with reference voltage $V_{REF-FB}$, comparator 462 generates demagnetization signal $S_{DEG-PRI}$, to determine demagnetization time TDEG in primary side S-PRM. Reference voltage $V_{REF-FB}$ is about equal to feedback voltage $V_{FB}$ when winding voltage $V_{AUX}$ is reflective voltage $N*V_{OUT}/M$. In FIG. 8, reference voltage $V_{REF-FB}$ is a sample that sample-and-hold circuit 460 samples feedback voltage $V_{FB}$ at an appropriate moment. For example, this appropriate moment may be moment t1 or t2 in FIG. 2C, moment t1 a moment in demagnetization time TDEG, moment t2 the end of the time when plateau detector 408 finds plateau PLT.

Figure 9A:
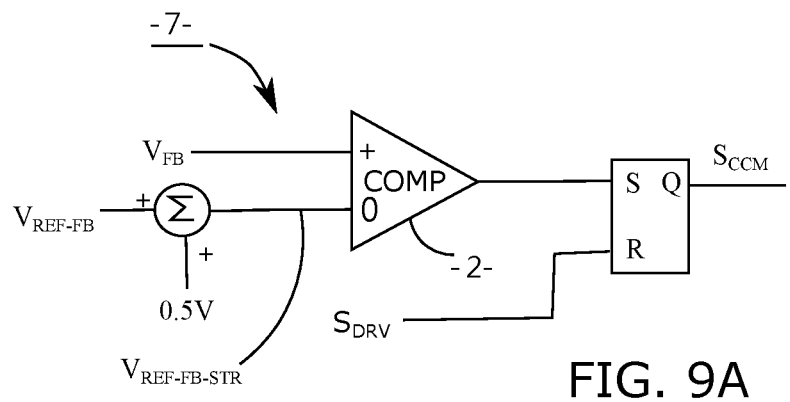
FIGS. 9A and 9B demonstrate a steep rising-edge detector and a gentle rising-edge detector respectively.
Figure 9B:
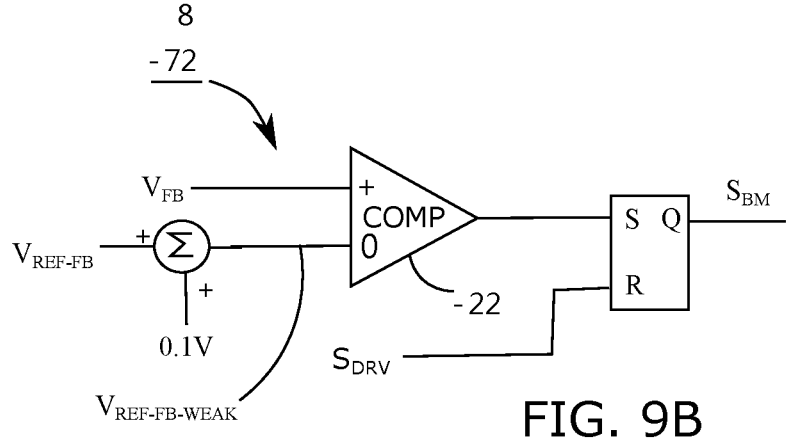

FIGS. 9A and 9B demonstrate steep rising-edge detector 404 and gentle rising-edge detector 406 suitable in use of FIG. 4. FIGS. 9A and 9B are alike, where steep rising-edge detector 404 in FIG. 9A compares with reference voltage $V_{REF-FB-STR}$ but gentle rising-edge detector 406 does with reference voltage $V_{REF-FB-WEAK}$. Reference voltages $V_{REF-FB-STR}$ and $V_{REF-FB-WEAK}$ correspond to reference voltages $V_{REF-STR}$ and $V_{REF-WEAK}$ in FIGS. 2A and 2B respectively. In the embodiments of FIGS. 9A and 9B, reference voltages $V_{REF-RB-STR}$ and $V_{REF-FB-WEAK}$ are respectively 0.5V and 0.1V more than reference voltage $V_{REF-FB}$, that sample-and-hold circuit 460 in FIG. 8 holds. Some embodiments of the invention might provide reference voltages $V_{REF-FB-STR}$ and $V_{REF-FB-WEAK}$ based on operation power source $V_{DD}$. For example, reference voltages $V_{REF-FB-STR}$ and $V_{REF-FB-WEAK}$ correspond to reference voltages $V_{REF-STR}$ and $V_{REF-WEAK}$ which are respectively 0.1V and 0.5V less than operation power source $V_{DD}$.

Figure 10:
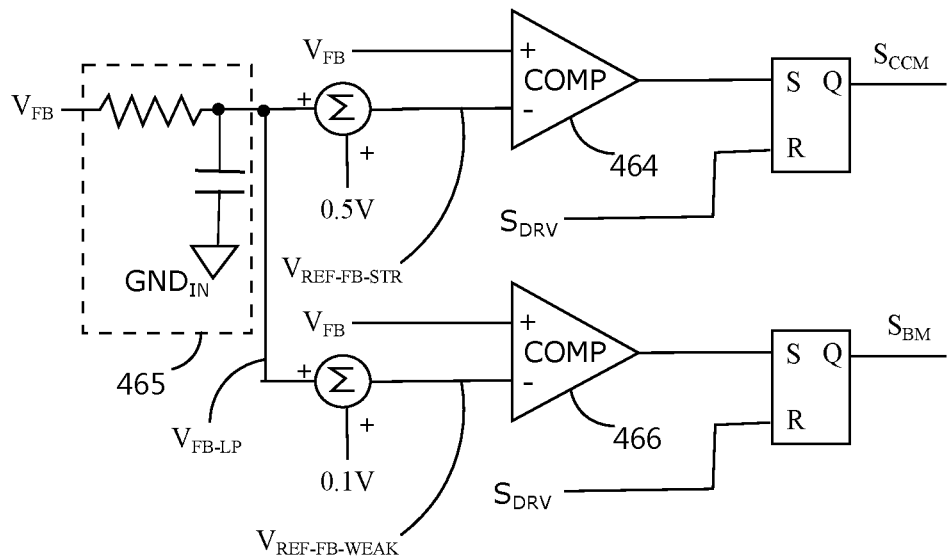
FIG. 10 demonstrates a circuit like the combination of the steep rising-edge detector and the gentle rising-edge detector in FIGS. 9A and 9B.

FIG. 10 demonstrates a circuit like the combination of steep rising-edge detector 404 and gentle rising-edge detector 406 in FIGS. 9A and 9B. FIG. 10 had low-pass filter 465, which provides signal $V_{FB-LP}$, a low-pass version of feedback voltage $V_{FB}$. As known in the art, low-pass filter 465 has time constant RC. In FIG. 10, if feedback voltage $V_{FB}$ has a rising edge with a slope more than the ratio of 0.5V to RC, step signal $S_{CCM}$ will turn into 1 in logic. Similarly, if feedback voltage $V_{FB}$ has a rising edge with a slope more than the ratio of 0.1V to RC, step signal $S_{BM}$ will turn into 1 in logic.

Figure 11:
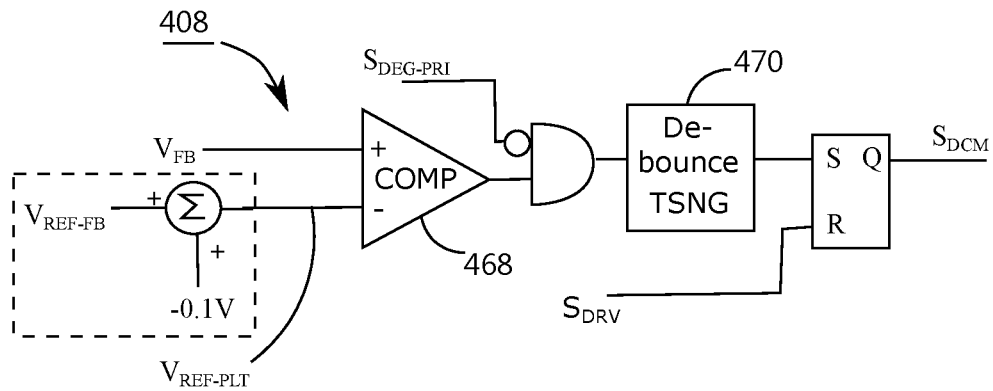
FIG. 11 shows a plateau detector.

FIG. 11 shows plateau detector 408 suitable in use of FIG. 4, including comparator 468 and debouncing apparatus 470. After demagnetization time TDEG or after demagnetization signal $S_{DEG-PRI}$ turns into 0 in logic, comparator 468 checks if feedback voltage $V_{FB}$ is about reference voltage $V_{REF-FB}$, by comparing feedback voltage $V_{FB}$ with reference voltage $V_{REF-PLT}$, a less version of reference voltage $V_{REF-FB}$. Shown in FIG. 11, reference voltage $V_{REF-PLT}$ is less than reference voltage $V_{REF-FB}$ by 0.1V. If the output of comparator 468 stays at 1 in logic longer than about time TSNG, debouncing apparatus 470 triggers the following SR flipflop to turn step signal $S_{DCM}$ into 1 in logic. Otherwise, step signal $S_{DCM}$ stays at 0 in logic. For example, pulse generator 208 in FIG. 3 provides a pulse with pulse width of 100 ns, and debouncing apparatus 470 in FIG. 11 turns step signal $S_{DCM}$ into 1 in logic if the output of comparator 468 stays at 1 in logic longer than 90 ns.

Figure 12:
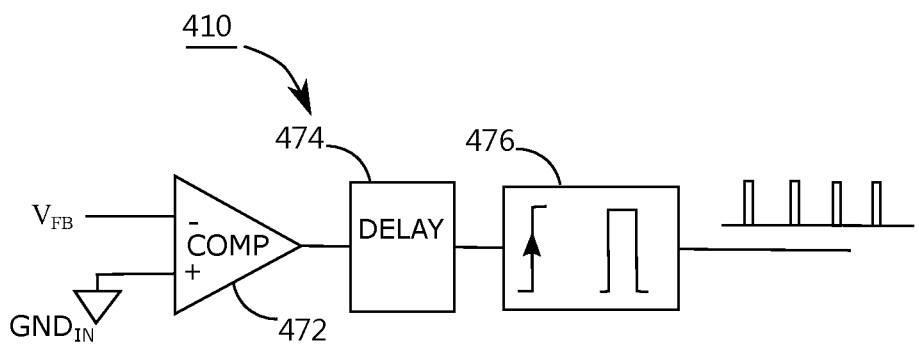
FIG. 12 shows a valley detector.

FIG. 12 shows valley detector 410 suitable in use of FIG. 4. Comparator 472 checks if feedback voltage $V_{FB}$ drops across 0V, the voltage of input ground line $GND_{IN}$. As shown in FIG. 2C, winding voltage $V_{AUX}$ is about to have a valley after dropping across 0V. Accordingly, after a predetermined delay, delayer 474 triggers pulse generator 476, which in response outputs a short pulse to indicate that winding voltage $V_{AUX}$ is about at a bottom of a valley.

Benefits of isolated power supply 100 include, but is not limited to, the followings. First, isolated power supply 100 needs no additional isolation devices such as photo couplers, capacitors, inductors, etc. Secondary-side controller 104 uses transformer TF, which originally exists in a conventional flyback converter, as a media to signal primary-side controller 102. Second, isolated power supply can operate in CCM, BM, or CCM, as demonstrated by FIGS. 2A, 2B and 2C. Third, there is no risk of explosion due to a short circuit between input power source $V_{IN}$ and output power source $V_{OUT}$. No matter what conduction mode isolated power supply 100 operates in, secondary-side switch SWSR in secondary side S-SEC is turned OFF whenever main switch 20 in primary side S-PRM is turned ON. Fourth but not the last, isolated power supply 100 may consume very little power when there is no load for output power source $V_{OUT}$ to supply power to. As long as output power source $V_{OUT}$ remains high enough, both secondary-side switch SWSR and main switch 20 may stay at a turned-OFF state all the time, consuming almost no power.

According to embodiments of the invention, secondary-side switch SWSR in secondary side S-SEC generally performs synchronous rectification, meaning that it is generally turned ON during demagnetization time TDEG to short secondary winding SEC to ground line $GND_{OUT}$, and generally turned OFF after demagnetization time TDEG to block current flowing to and forth between secondary winding SEC and ground line $GND_{OUT}$. In order to signal primary-side controller 102 via transformer TF as a media, the operation for secondary-side switch SWSR to achieve synchronous rectification is slightly modified. If secondary-side controller 104 decides to inform primary-side controller 102 the end of a switching cycle, or the end of blanking time TBLNK, before the end of demagnetization time TDEG, secondary-side switch SWSR is turned OFF earlier, stopping transformer TF from releasing power to charge output power source $V_{OUT}$. If secondary-side controller 104 decides to inform primary-side controller 102 the same message after the end of demagnetization time TDEG, secondary-side switch SWSR is briefly turned ON, letting output power source $V_{OUT}$ magnetize secondary winding SEC.

Secondary-side switch SWSR and secondary-side controller 104 in FIG. 1 may vary in some embodiments of the invention.

Figure 13:
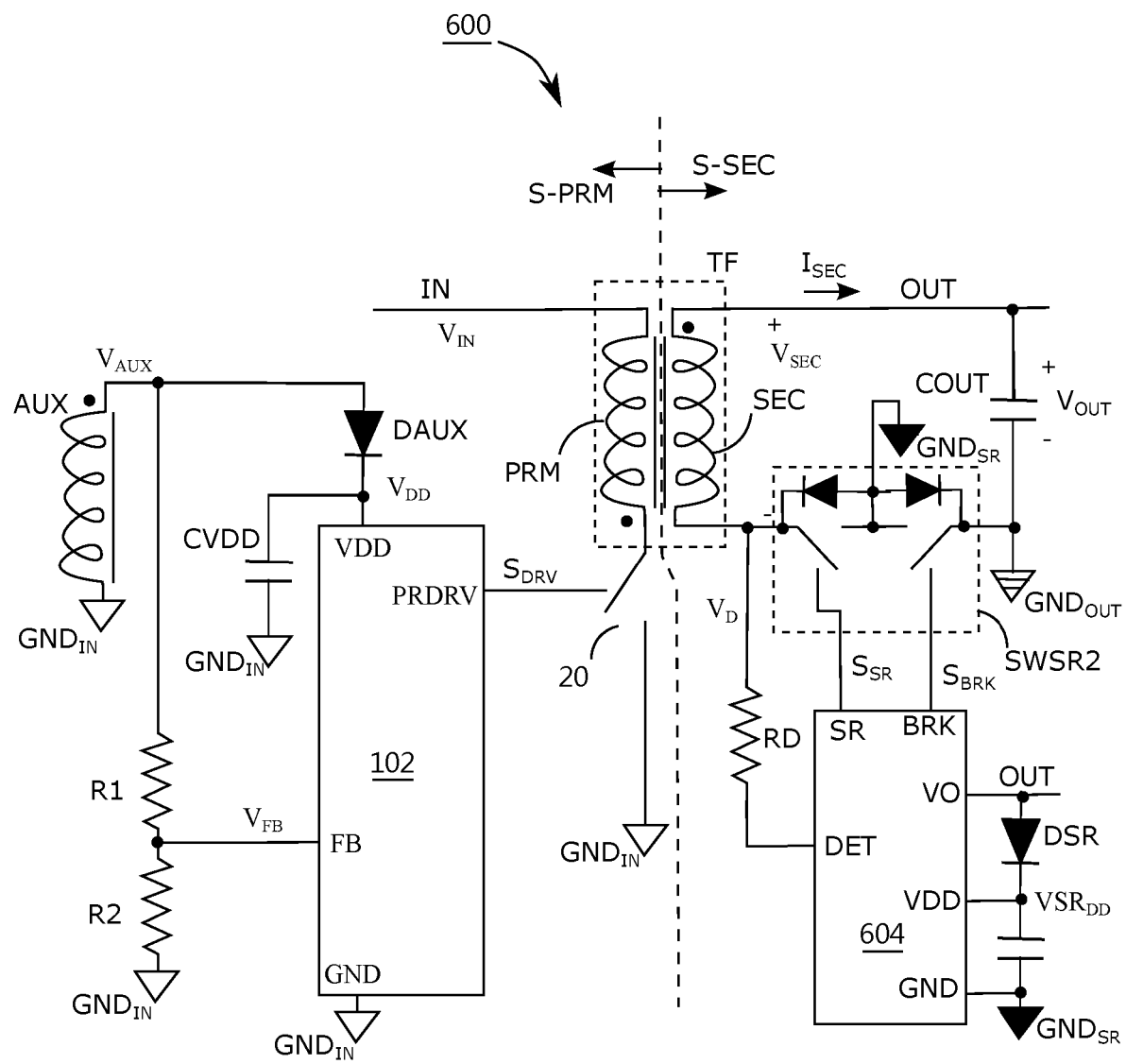
FIG. 13 shows an isolated power supply according to embodiments of the invention.

FIG. 13 shows isolated power supply 600 according to embodiments of the invention. Isolated power supply 600 has portions similar or the same with isolated power supply 100, and these portions may not be detailed further because they are comprehensible in view of the previous teaching of isolated power supply 100. Isolated power supply 600 has secondary-side switch SWSR2 and secondary-side controller 604 to replace secondary-side switch SWSR and secondary-side controller 104 in FIG. 1. As shown in FIG. 13, the two switches back-to-back connected within secondary-side switch SWSR2 are respectively controlled by driving signal $S_{SR}$ and connection signal $S_{BRK}$, both of which secondary-side controller 604 provides.

Figure 14A:
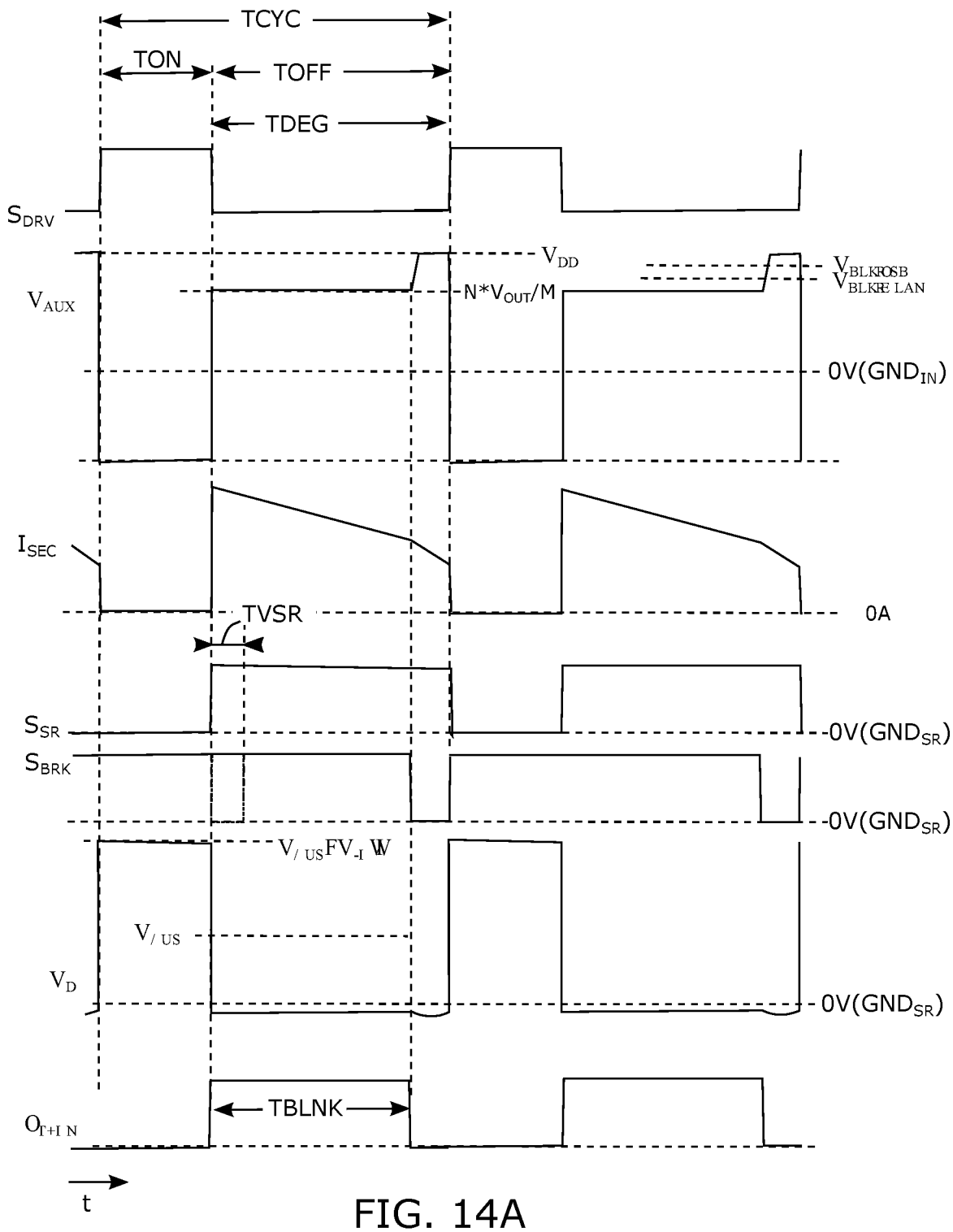
FIGS. 14A and 14B demonstrate waveforms of signals when the isolated power supply in FIG. 13 operates in CCM and DCM respectively.
Figure 14B:
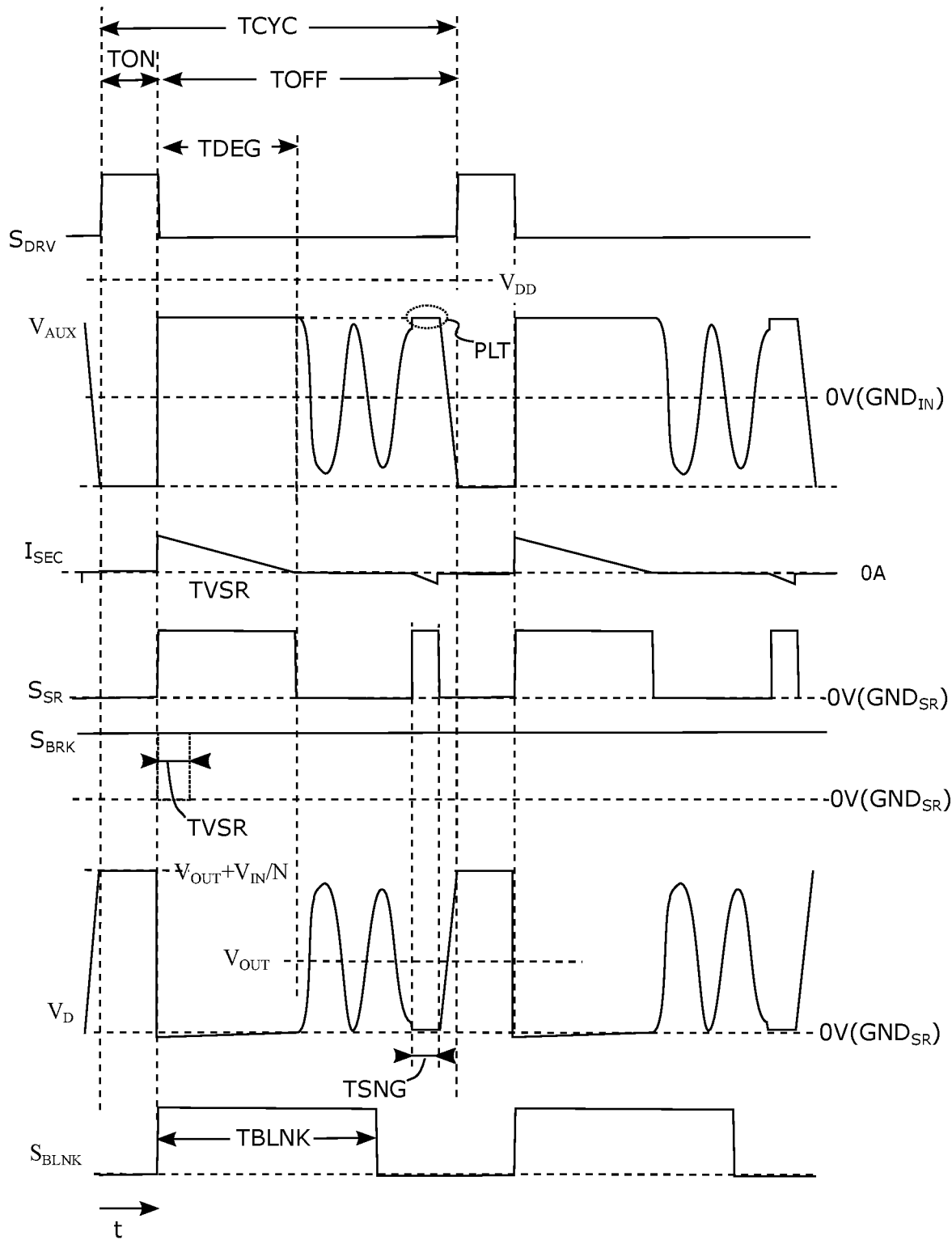

Please refer to FIGS. 14A and 14B, demonstrating waveforms of signals when isolated power supply 600 in FIG. 13 operates in CCM and DCM respectively. FIGS. 14A and 14B are similar with FIGS. 2A and 2C respectively, but each of FIGS. 14A and 14B replaces driving signal $S_{SR}$ in FIGS. 2A and 2C with driving signal $S_{SR}$ and connection signal $S_{BRK}$. The similar or the same aspects between FIGS. 14A and 2A, and between FIGS. 14B and 2C are not detailed hereinafter for brevity.

Please refer to FIGS. 13 and 14A. As shown in FIG. 14A, after blanking time TBLNK ends earlier than demagnetization time TDEG, connection signal $S_{BRK}$ turns OFF one of the switches in secondary-side switch SWSR2 to disconnect secondary winding SEC from ground line $GND_{OUT}$. Accordingly, energy stored in transformer TF is not released to output power source $V_{OUT}$, and winding voltage $V_{AUX}$ accordingly has a rising edge so that secondary-side controller 604 informs the end of blanking time TBLNK to primary-side controller 102, which can start a new switching cycle TCYC.

Please refer to FIGS. 13 and 14B. As shown in FIG. 14B, after both blanking time TBLNK and demagnetization time TDEG end, driving signal $S_{SR}$ and connection signal $S_{BRK}$ turn ON both the switches in secondary-side switch SWSR2 to briefly connect secondary winding SEC to ground line GND$_{OUT}$. Accordingly, winding voltage V$_{AUX}$ has plateau PLT so that secondary-side controller 604 informs the end of blanking time TBLNK to primary-side controller 102, which can start a new switching cycle TCYC.

Shown in FIGS. 14A and 14B, during period TVSR at the beginning of demagnetization time TDEG, connection signal S$_{BRK}$ could optionally and briefly turn OFF one of the switches in secondary-side switch SWSR2 to disconnect secondary winding SEC from ground line GND$_{OUT}$, so energy stored in transformer TF is released to charge operation power source VSR$_{DD}$.

Figure 15:
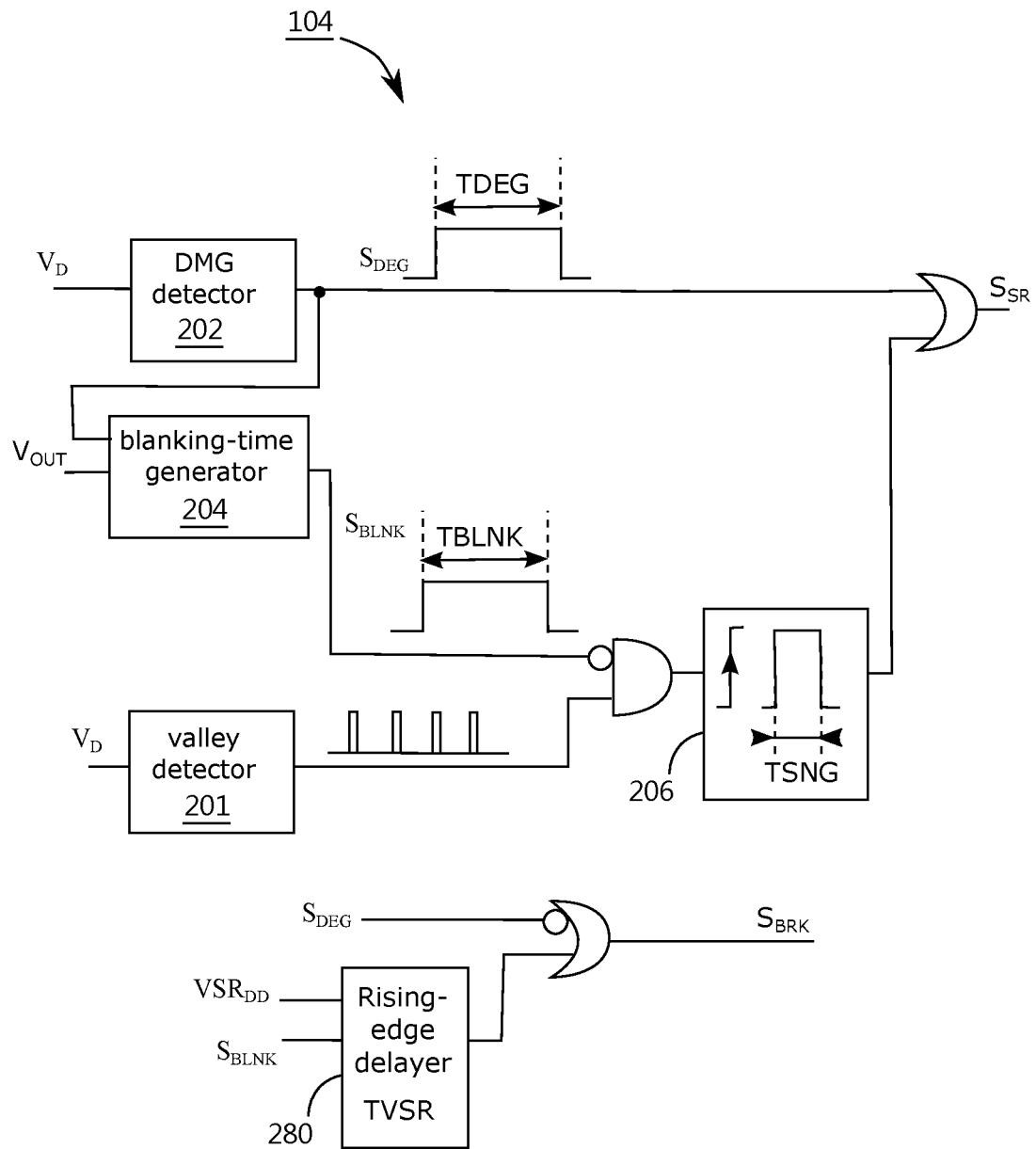
FIG. 15 demonstrates a secondary-side controller.

FIG. 15 demonstrates secondary-side controller 604 in use of FIG. 13. FIG. 15 has similar or the same apparatuses or connections with those shown in FIG. 3, which are not detailed hereinafter because they are comprehensible based on the previous teaching for FIG. 3. Secondary-side controller 604 in FIG. 15 could generate and achieve waveforms and functions that FIGS. 14A and 14B teaches.

Figures 16A, 16B:
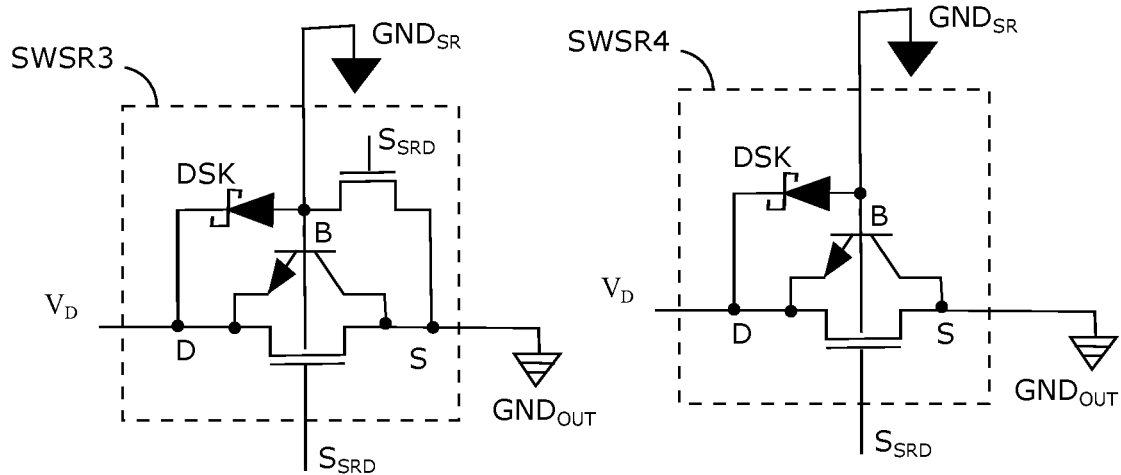
FIGS. 16A and 16B demonstrate two secondary-side switches.
Figure 17:
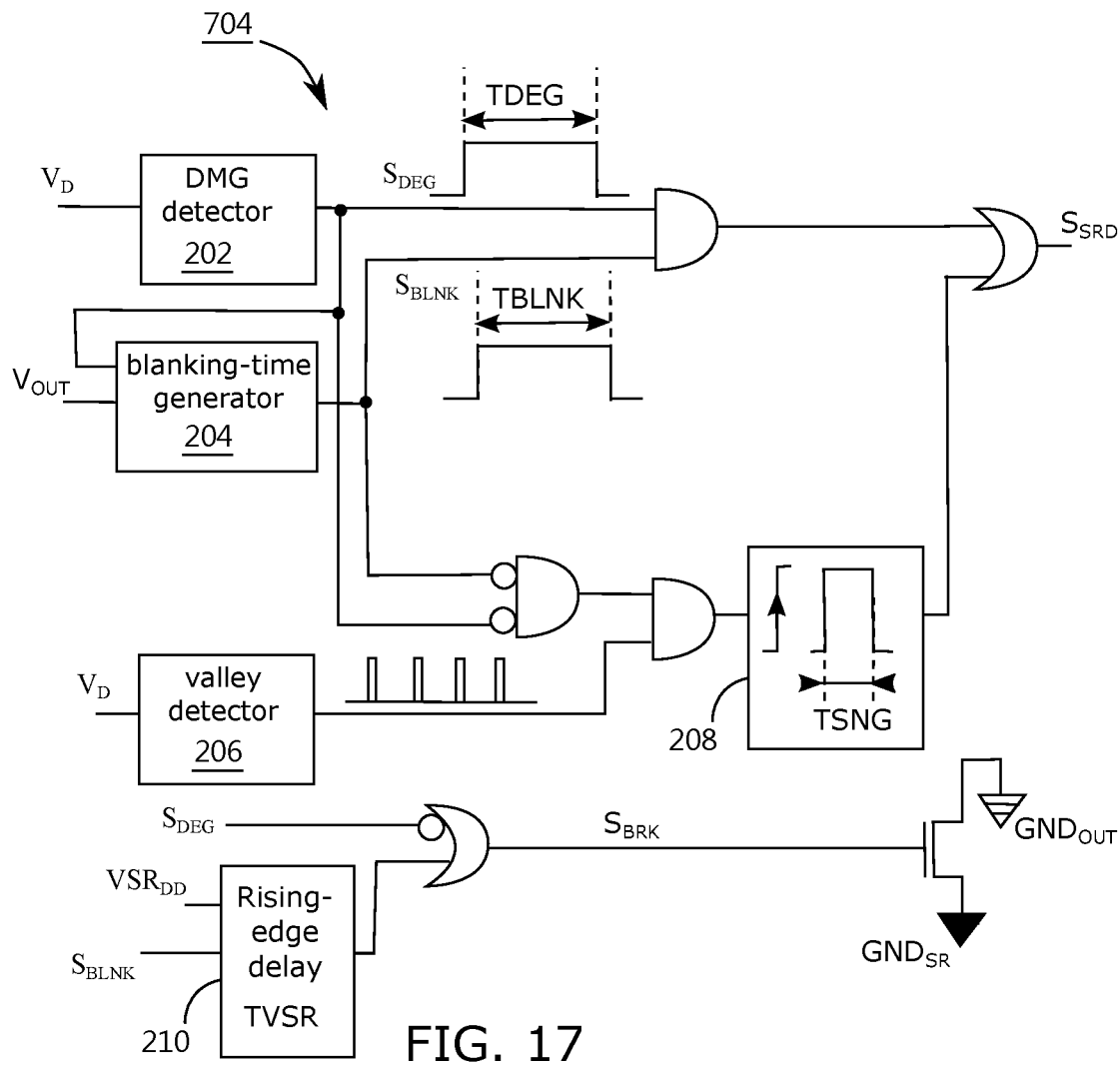
FIG. 17 illustrates a secondary-side controller.

In some embodiments of the invention, secondary-side switch SWSR3 in FIG. 16A replaces secondary-side switch SWSR in FIG. 1, and secondary-side controller 704 in FIG. 17 replaces secondary-side controller 104 in FIG. 1. Schlocky diode DSK in FIG. 16A makes sure that secondary-side switch SWSR3 isolates secondary winding SEC from ground line GND$_{OUT}$ when driving signal S$_{SRD}$ is 0 in logic. Driving signal S$_{SRD}$ in FIG. 16A could have the waveforms of driving signal S$_{SRD}$ in FIGS. 2A, 2B and 2C, and connection signal S$_{BRK}$ in FIG. 17 could have the waveforms of connection signal S$_{BRK}$ in FIGS. 14A and 14B. When connection signal S$_{BRK}$ is 1 in logic, ground line GND$_{OUT}$ shorts to ground line GND$_{SR}$. The voltage of ground line GND$_{SR}$ might substantially equal to the lower one of channel signal V$_D$ and ground line GND$_{OUT}$.

In some embodiments of the invention, secondary-side switch SWSR4 in FIG. 16B replaces secondary-side switch SWSR in FIG. 1, and secondary-side controller 704 in FIG. 17 replaces secondary-side controller 104 in FIG. 1. Schlocky diode DSK in FIG. 16B makes sure that secondary-side switch SWSR4 isolates secondary winding SEC from ground line GND$_{OUT}$ when driving signal S$_{SRD}$ is 0 in logic. Driving signal S$_{SRD}$ in FIG. 16B could have the waveforms of driving signal S$_{SRD}$ in FIGS. 2A, 2B and 2C, and connection signal S$_{BRK}$ could have the waveforms of connection signal S$_{BRK}$ in FIGS. 14A and 14B. When connection signal S$_{BRK}$ is 1 in logic, ground line GND$_{OUT}$ shorts to ground line GND$_{SR}$. The voltage of ground line GND$_{SR}$ might substantially equal to the lower one of channel signal V$_D$ and ground line GND$_{OUT}$.

Figure 18:
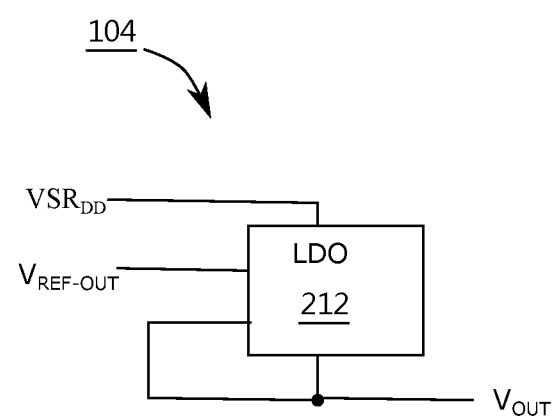
FIG. 18 shows a LDO in a secondary-side controller.

According to some embodiments of the invention, secondary-side controller 104 further has low dropout (LDO) 212 as shown in FIG. 18. For example, secondary-side controller 104 could uses LDO 212 and lets operation power source VSR$_{DD}$ release its power to charge output power source V$_{OUT}$ in the condition that output power source V$_{OUT}$ is way below target voltage V$_{REF-OUT}$ too much, thereby urgently pulling up output power source V$_{OUT}$. For example, if output power source V$_{OUT}$ is found to be less than target voltage V$_{REF-OUT}$ by 0.1V, LDO 212 is briefly activated, so operation power source VSR$_{DD}$, acting as an emergent power source, starts to charge and raise output power source V$_{OUT}$.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An isolated power supply for converting an input power source in a primary side into an output power source in a secondary side, where the primary side is galvanically isolated from the secondary side, the isolated power supply comprising:
   a transformer with a primary winding and a secondary winding;
   a main switch in the primary side, connected with the primary winding;
   a primary-side controller, controlling the main switch;
   a secondary-side switch in the secondary side, connected with the secondary winding; and
   a secondary-side controller controlling the secondary-side switch, and detecting a demagnetization time of the transformer;
   wherein the secondary-side controller turns OFF the secondary-side switch before the end of the demagnetization time, to signal, via the transformer, the primary-side controller, which in response turns ON the main switch to operate the isolated power supply in a continuous-conduction mode or in a boundary mode.

2. The isolated power supply of claim 1, wherein secondary-side switch is a bidirectional switch.

3. The isolated power supply of claim 1, wherein the secondary-side controller comprises:
   a demagnetization detector detecting the demagnetization time of the transformer to turn ON the secondary-side switch, thereby the transformer supplying power to the output power source; and
   a blanking-time generator determining a blanking time in response to the output power source;
   wherein, when the blanking time ends before the demagnetization time ends, the secondary-side controller turns OFF the secondary-side switch to signal to the primary-side controller.

4. The isolated power supply of claim 1, wherein the secondary-side controller comprises:
   a delayer, for delaying to turn ON the secondary-side switch for a predetermined beginning portion of the demagnetization time, thereby the transformer not supplying power to the output power source during the predetermined beginning portion.

5. The isolated power supply of claim 1, wherein the secondary-side controller turns ON the secondary-side switch after the demagnetization time ends, to signal, via the transformer, the primary-side controller, which in response turns ON the main switch to operate the isolated power supply in a discontinuous-conduction mode.

6. A secondary-side controller for controlling a secondary-side switch connected to a secondary winding of a transformer, the secondary-side controller comprising:
   a demagnetization detector detecting a demagnetization time of the transformer; and
   a blanking-time generator providing a blanking time in response to the output power source;
   wherein before neither the demagnetization time nor the blanking time ends, the secondary-side controller turns ON the secondary-side switch, so the transformer supplies power to an output power source; and
   after the blanking time ends and before the demagnetization time ends, the secondary-side controller turns OFF the secondary-side switch, so the transformer stops supplying power to the output power source.

7. The secondary-side controller of claim 6, wherein, after both the blanking time and the demagnetization time end, the secondary-side controller turns ON the secondary-side switch, so the output power source energizes the transformer.

8. The secondary-side controller of claim 7, comprising:
a valley detector, for detecting a channel signal at a terminal of the secondary-side switch, to find a valley of the channel signal;
wherein, after both the blanking time and the demagnetization time end, the secondary-side controller turns ON the secondary-side switch in response to a finding of the valley, performing valley switching to the secondary-side switch.

9. A primary-side controller for controlling a main switch in an isolated power supply, wherein the main switch is connected to a primary winding of a transformer, the primary-side controller comprising:
a demagnetization detector detecting a demagnetization time of the transformer in response to a winding voltage, wherein the winding voltage represents a voltage across the primary winding;
an end-of-cycle detector for detecting whether the winding voltage has a predetermined waveform during the demagnetization time, to turn ON the main switch,
wherein the end-of-cycle detector is a first rising-edge detector, the primary-side controller further comprises a second rising-edge detector, and the first and second rising-edge detectors cause the isolated power supply to operate in continuous-conduction and boundary modes respectively.

10. The primary-side controller of claim 9, wherein the primary-side controller controls the main switch to have cycle times, each consisting of an ON time and an OFF time, and the primary-side controller determines a next ON time in a next cycle time based on a past cycle time.

11. The primary-side controller of claim 9, further comprising:
a plateau detector for determining whether a specific plateau occurs to the winding voltage after an end of the demagnetization time, to operate the isolated power supply in a discontinuous-conduction mode.

12. A control method in use of an isolated power supply converting an input power source in a primary side into an output power source in a secondary side, wherein the isolated power supply comprises a transformer with a primary winding and a secondary winding, a main switch connected with the primary winding in the primary side, and a secondary-side switch connected with the secondary winding in the secondary side, the control method comprising:
detecting a demagnetization time of the transformer;
turning ON the secondary-side switch to let the transformer supply power to the output power source during the demagnetization time;
turning OFF the secondary-side switch before the demagnetization time ends;
in response to the step of turning OFF the secondary-side switch before the demagnetization time ends, turning ON the main switch to let the input power source energize the transformer, thereby the isolated power supply operating in a continuous-conduction mode or a boundary mode;
providing a blanking time based on the output power source; and
turning OFF the secondary-side switch when the blanking time ends earlier than the demagnetization time ends.

13. The control method of claim 12, comprising:
turning OFF the secondary-side switch after the demagnetization time ends and before the blanking time ends;
turning ON the secondary-side switch after both the demagnetization time and the blanking time end; and
in response to the step of turning ON the secondary-side switch after both the demagnetization time and the blanking time end, turning ON the main switch to let the input power source energize the transformer, thereby the isolated power supply operating in a discontinuous-conduction mode.

14. The control method of claim 12, comprising:
turning ON the main switch for an ON time, wherein the ON time is determined based on a past cycle time of the main switch, and the past cycle time comprises a past ON time.

* * * * *